(12) United States Patent
Nakada et al.

(10) Patent No.: US 6,455,989 B1
(45) Date of Patent: Sep. 24, 2002

(54) ELECTRON EMISSION SOURCE, PRODUCTION METHOD THEREOF, AND DISPLAY USING THE ELECTRON EMISSION SOURCE

(75) Inventors: Satoshi Nakada, Kanagawa; Eisuke Negishi, Tokyo, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/538,402

(22) Filed: Mar. 29, 2000

(30) Foreign Application Priority Data

Mar. 31, 1999 (JP) ............................................ 11-092280

(51) Int. Cl.[7] .................................................. H01J 1/02
(52) U.S. Cl. ........................ 313/309; 313/495; 313/336; 313/351
(58) Field of Search ................................ 313/309, 310, 313/336, 351, 495

Primary Examiner—Vip Patel

(74) Attorney, Agent, or Firm—Rader, Fishman & Grauer PLLC; Ronald P. Kananen, Esq.

(57) ABSTRACT

An electron emission source includes a plurality of strip-like cathode electrode lines formed on a lower substrate, an insulating layer formed on the cathode electrode lines; and a plurality of strip-like gate electrode lines formed on the insulating layer in such a manner as to intersect the cathode electrode lines, wherein a number of fine holes are formed in each of intersections between the cathode electrode lines and the gate electrode lines. The intersection forms a pixel region corresponding to one pixel of a display. The fine holes pass through the gate electrode lines and the insulating layer and reach the cathode electrode lines. A metal made projecting structure having a trapezoidal shape in cross-section is formed in each of the fine holes in such a manner as to project from the bottom of the fine hole. An electron emission portion on the surface of which carbon nano-tubes are erected is formed on the upper surface of the projecting structure. Such an electron emission source is effective to realize a low voltage drive, make the current amount uniform, avoid the extension of electron beams, prolong the service life, and prevent occurrence of short-circuit between the electrodes upon production.

16 Claims, 14 Drawing Sheets

F I G. 7
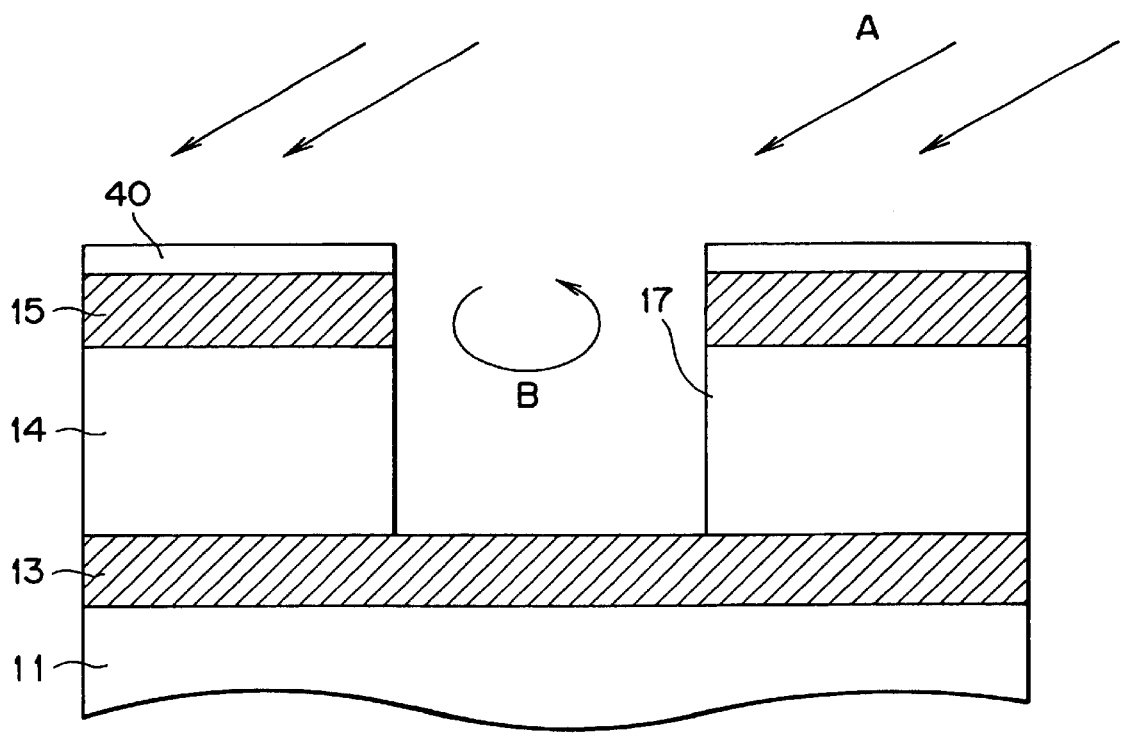

ELECTRON EMISSION SOURCE, PRODUCTION METHOD THEREOF, AND DISPLAY USING THE ELECTRON EMISSION SOURCE

BACKGROUND OF THE INVENTION

The present invention relates to an electron emission source typically suitable for an ultrathin display, a production method thereof, and a display using the electron emission source.

Conventionally, there has been proposed an ultrathin display of a type in which a panel-like electron emission source is provided inside a fluorescent screen of the display and a number of microchips made from an electron emission material are formed in each of pixel regions of the electron emission source, wherein the fluorescent screen is made luminous by exciting the microchips in the corresponding pixel regions in response to specific electric signals.

The electron emission source of this type includes a plurality of strip-like cathode electrode lines (first electrodes); a plurality of strip-like gate electrode lines (second electrodes) formed on the cathode electrode lines in such a manner as to intersect the cathode electrode lines; and the microchips disposed in an intersection region (corresponding to one pixel of the display) located between each of the cathode electrode lines and each of the gate electrode lines.

The configuration of the prior art electron emission source will be more concretely described with reference to FIG. 1. A plurality of strip-like cathode electrode lines 103 are formed on a lower substrate 101 made from typically a glass material; an insulating layer 104 is formed on the cathode electrode lines 103 excluding connection ends 103a thereof; and a plurality of strip-like gate electrode lines 105 are disposed on the insulating layer 104 in such a manner as to intersect the cathode electrode lines 103. The connection ends 103a of the cathode electrode lines 103 and connection ends 105a of the gat e electrode lines 105 are connected to a control means 109.

A number of fine holes 17 are formed in an intersection region between each of the cathode electrode lines 103 and each of the gate electrode lines 105. The fine holes 17 pass through the gate electrode line 105 and the insulating layer 104 and reach the surface of the cathode electrode line 103. A microchip 106 is provided in each of the fine holes 17 in such a manner as to project from the bottom of the fine hole 17.

The microchips 106 are each formed into an approximately conical shape by using an electron emission material such as molybdenum, and are disposed on the cathode electrode lines 103. The height of the leading end of the conical body of each microchip 106 is substantially the same as the height of the film surface of the gate electrode line 105. In this way, a number of the microchips 106 are provided in the intersection region between each of the cathode electrode lines 103 and each of the gate electrode lines 105, and the intersection region forms a pixel region which corresponds to one pixel of the display.

The electron emission source, designated by reference numeral 100 in FIG. 1, is operated by selecting a desired one of the cathode electrode lines 103 and a desired one of the gate electrode lines 105 and applying a specific voltage therebetween by the control means 109, to apply the specific voltage to the microchips 106 in the corresponding pixel region, thereby allowing electrons to be emitted from the leading ends of the microchips 106 on the basis of the tunnel effect. In the case of using the microchips 106 made from molybdenum, the specific voltage applied to each microchip 106 is set at such a value as to obtain the strength of an electric field near the leading end of the conical body of the microchip 106 in a range of about $10^8$ to about $10^{10}$ V/m.

When the electron emission source 100 shown in FIG. 1 is used for a display, a transparent upper substrate (not shown) is assembled to the electron emission source 100 in such a manner as to be disposed on the gate electrode lines 105 with a gap put therebetween. Strip-like anode electrode lines are formed on the under face of the upper substrate and phosphor stripes are formed on the anode electrode lines. The anode electrode lines are made from a transparent conductive material such as ITO (Indium Tin Oxide). Connection ends of the anode electrode lines are connected to the control means 109. A space between the upper substrate and the lower substrate 101 is configured as a high vacuum region.

Such a display is operated such that electrons emitted from the microchips 106 in a desired pixel region by exciting the pixel region are accelerated by a voltage applied between the corresponding cathode electrode line 103 and anode electrode line, passing through the vacuum region between the gate electrode lines 105 and the anode electrode lines, and reach the corresponding phosphor stripe. When the electrons are thus made incident on the phosphor stripe, visual light is emitted from an electron-incident portion of the phosphor stripe and is observed through the transparent anode electrode line and upper substrate.

The above-described prior art electron emission source has the following problems:

At first, it is difficult to uniformly produce the microchips 106, particularly, the leading ends thereof without occurrence of differences in size and/or shape therebetween. If there occur differences in size between the microchips 106, the amount of electrons emitted from the microchips 106, that is, the amount of a current flowing the microchips 106 differs for each pixel. As a result, luminous spots formed on the upper substrate of the display become non-uniform, thereby degrading the image quality.

At second, gas remaining in the high vacuum region between the lower substrate 101 and the upper substrate is ionized to sputter the microchips 106, so that the shapes of the leading ends of the microchips 106 tend to be easily deteriorated with an elapsed time, thereby reducing the amount of a current flowing in the microchips 106.

At third, since the flying direction of electrons emitted from the microchips 106 is extended by about ±30° with respect to the direction perpendicular to the cathode plane, the luminous region of the phosphor screen composed of the phosphor stripes is enlarged. This is disadvantageous in terms of high-definition of the display.

At fourth, the prior art electron emission source has a problem in its production steps. The microchips 106 are generally formed by vapor-depositing a refractory metal such as molybdenum in vacuum with a lift-off spacer left on the gate electrode lines 105. To be more specific, the conical microchips 106 are formed in self-alignment by reversely making use of the poor step-coverage which is the characteristic of the vacuum vapor-deposition process, and then the refractory metal such as molybdenum deposited on the lift-off spacer is removed by a lift-off process. At this time, metal pieces peeled by lift-off enter in each fine hole, to cause short-circuit between the microchip 106 and the gate electrode line 105, thereby causing short-circuit between the cathode electrode line 103 and the gate electrode line 105. As a result, there arises a problem in degrading the production yield.

To solve the above-described problems, an electron emission source of a type using electron emission planes has been disclosed in Japanese Patent Laid-open No. Hei 8-55564. According to this prior art technique, since the electron emission planes are used in place of the microchips, it is possible to avoid the above-described problems associated with the microchips.

Such a technique, however, has another problem that since the distance between the cathode electrode lines 103 and the gate electrode lines 105 of a display according to this technique is longer than that in the case of using the microchips 106, a high voltage is required to be applied between the electrode lines 103 and 105 in order to ensure a sufficient amount of a current for obtaining a high brightness, thereby bringing a possibility of occurrence of electric breakdown.

SUMMARY OF THE INVENTION

A first object of the present invention is to provide an electron emission source which is capable of being driven at a low voltage, making a current amount uniform, reducing the extension of electron beams, prolonging the service life, and reducing the possibility of short-circuit between electrodes.

A second object of the present invention is to provide a method of producing the above electron emission source.

A third object of the present invention is to provide a display using the above electron emission source.

To achieve the above first object, according to the present invention, there is provided an electron emission source including: a first electrode extending on a substrate; a second electrode extending on the first electrode via an insulating layer; one or a plurality of fine holes opened in the second electrode in such a manner as to reach the first electrode through the insulating layer; a metal made projecting structure having a trapezoidal shape in cross-section, the projecting structure being formed in each of the one or plurality of fine holes in such a manner as to project from a portion, positioned in the fine hole, of the first electrode; and an electron emission portion made from an electron emission material, the electron emission portion being formed on the upper surface of the projecting structure; wherein a projecting body composed of an enormous number of fine projections is provided on the surface of the electron emission portion.

To achieve the above second object, according to the present invention, there is provided a method of producing an electron emission source including the steps of: forming a first electrode, an insulating layer, and a second electrode on a substrate in this order; forming one or a plurality of fine holes in the second electrode in such a manner that the one or plurality of fine holes reach the first electrode through the insulating layer; forming a metal made projecting structure having a trapezoidal shape in cross-section in each of the one or plurality of fine holes in such a manner that the projecting structure projects from a portion, positioned in the fine hole, of the first electrode; and forming, an electron emission portion made from an electron emission material on the surface of which a projecting body composed of an enormous number of projections are provided, on the upper surface of the projecting structure.

To achieve the above third object, according to the present invention, there is provided a display including: an electron emission source including: a first electrode extending on a substrate; a second electrode extending on the first electrode via an insulating layer; one or a plurality of fine holes opened in the second electrode in such a manner as to reach the first electrode through the insulating layer; a metal made projecting structure having a trapezoidal shape in cross-section, the projecting structure being formed in each of the one or plurality of fine holes in such a manner as to project from a portion, positioned in the fine hole, of the first electrode; and an electron emission portion made from an electron emission material, the electron emission portion being formed on the upper surface of the projecting structure; wherein a projecting body composed of an enormous number of fine projections is provided on the surface of the electron emission portion; and an anode electrode and a phosphor screen disposed opposite to the electron emission source with a gap put therebetween; whereby electrons are emitted from the electron emission portion by applying a voltage between the first and second electrodes, and are made incident on the phosphor screen to make luminous the phosphor screen.

The electron emission source of the present invention, which is configured such that the projecting structure projects from the first electrode and the electron emission portion is formed on the projecting structure, is advantageous in that as compared with the prior art electron emission source using the electron emission planes, it is possible to significantly shorten the distance between the electron emission portion and the second electrode, and hence to ensure a sufficient current amount even if a voltage applied between the first and second electrodes is lowered.

In the case of using carbon as the electron emission material, it is possible to ensure a current amount necessary for the display only by applying an electric field strength of about several tens $V/\mu m$ or less to the electron emission portion, that is, only by applying a voltage of several tens V or less between the first and second electrodes. That is to say, it is possible to drive the electron emission source at a low voltage.

Further, according to the electron emission source of the present invention, since the projecting body composed of an enormous number of projections is provided on the surface of the electron emission portion, electrons are easily emitted from the electron emission portion. As a result, it is possible to drive the electron emission source at a lower voltage.

Since the electron emission portion formed on the projecting structure having a trapezoidal shape in cross-section is not sharpened, that is, flattened unlike the microchip, it is easy to uniformly produce the electron emission portions, and thereby it is possible to solve the problem that the current amount varies for each pixel.

The flat shape of the electron emission portion brings another advantage that electrons emitted from the electron emission portion are allowed to be filed while being not extended so much.

The flat shape of the electron emission portion brings a further advantage that even if gas remaining in the vacuum region is ionized to sputter the electron emission portion, the shape of the electron emission portion is not changed, and accordingly, it is possible to eliminate the inconvenience that the current amount is reduced with an elapsed time and hence to prolong the service life.

Since the distance between the second electrode and the electron emission portion is longer than that in the case of using the microchips, it is possible to suppress occurrence of short-circuit between the electrodes and hence to improve the production yield.

BRIEF DESCRIPTION OF THE DRAWINGS

FIGS. 7 to 10 are partial sectional side views showing steps of producing the electron emission source according to the first embodiment;

DETAILED DESCRIPTION OF THE PREFERRED EMBODIMENTS

Hereinafter, embodiments of the present invention will be described with reference to the accompanying drawings.

First Embodiment

Figure 2:
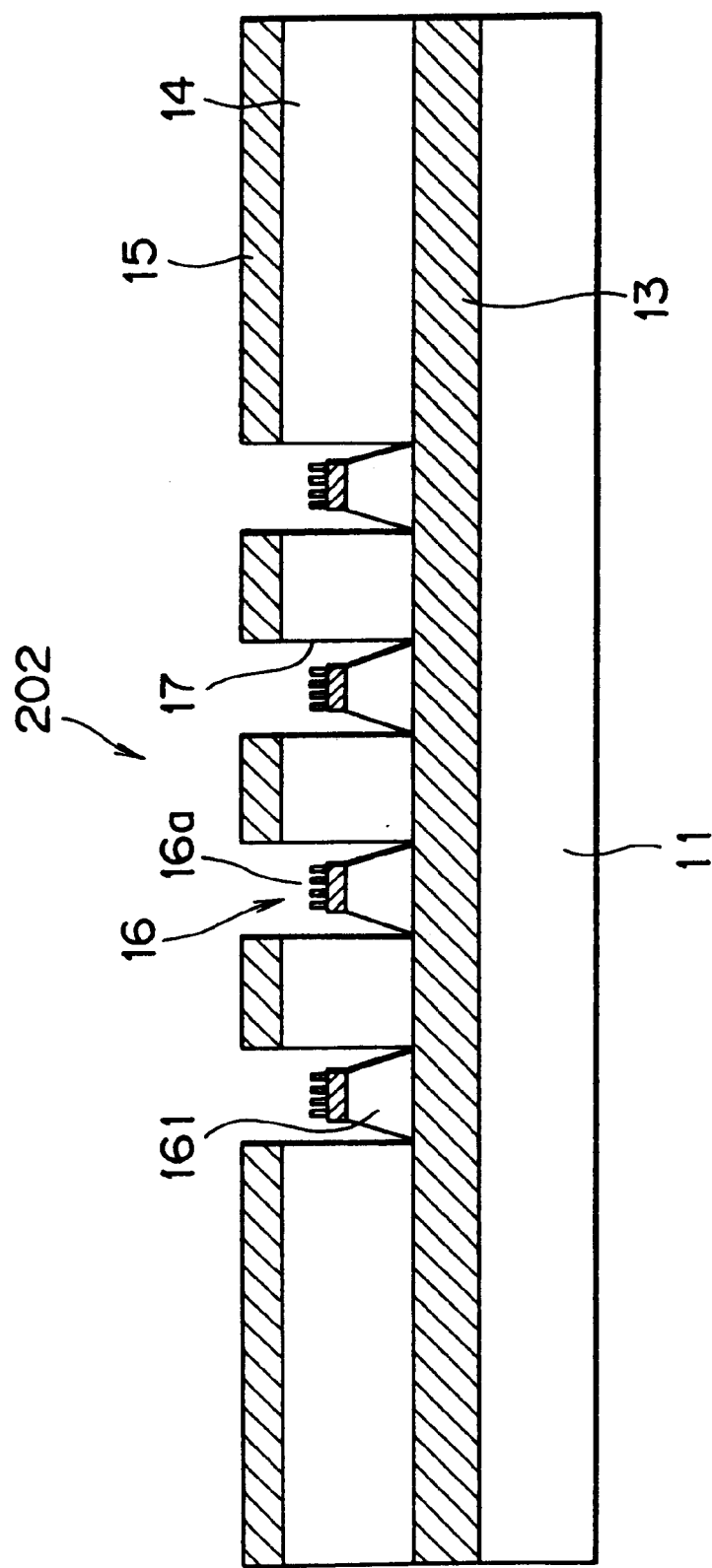
FIG. 2 is a partial sectional side view showing, on an enlarged scale, an electron emission source according to a first embodiment.
Figure 6:
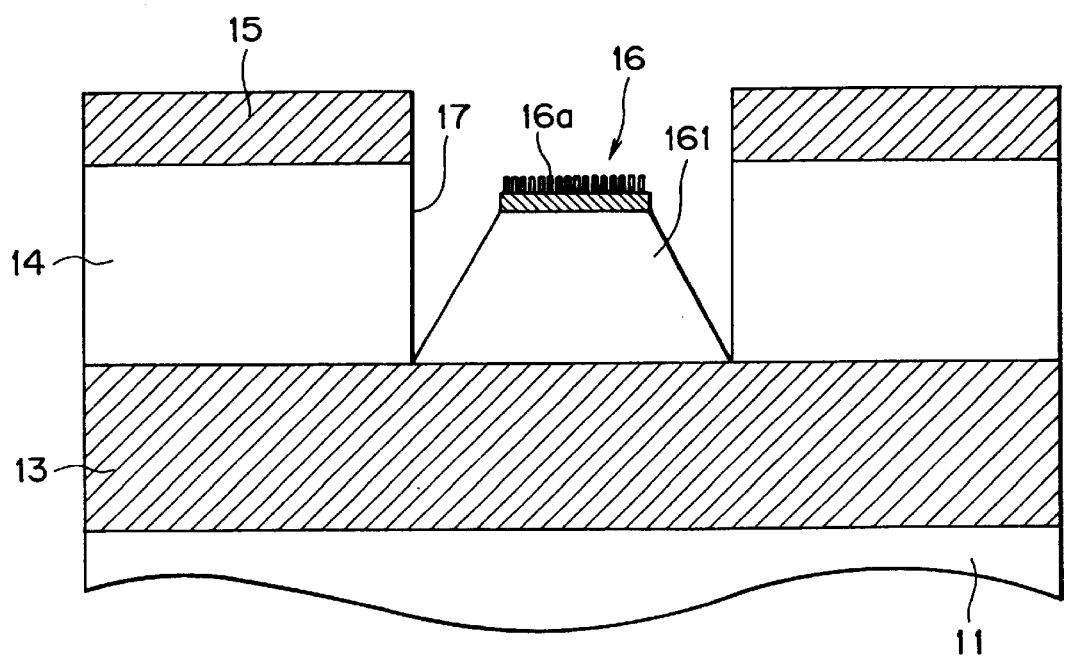
FIG. 6 is a partial sectional side view showing, on a further enlarged scale, the electron emission source according to the first embodiment.

FIG. 2 is a partial sectional side view showing, on an enlarged scale, an electron emission source according to a first embodiment; FIG. 6 is a partial sectional side view showing, on a further enlarged scale, the electron emission source of the first embodiment; and FIG. 4 is a partial plan view showing the electron emission source of the first embodiment.

Figure 3:
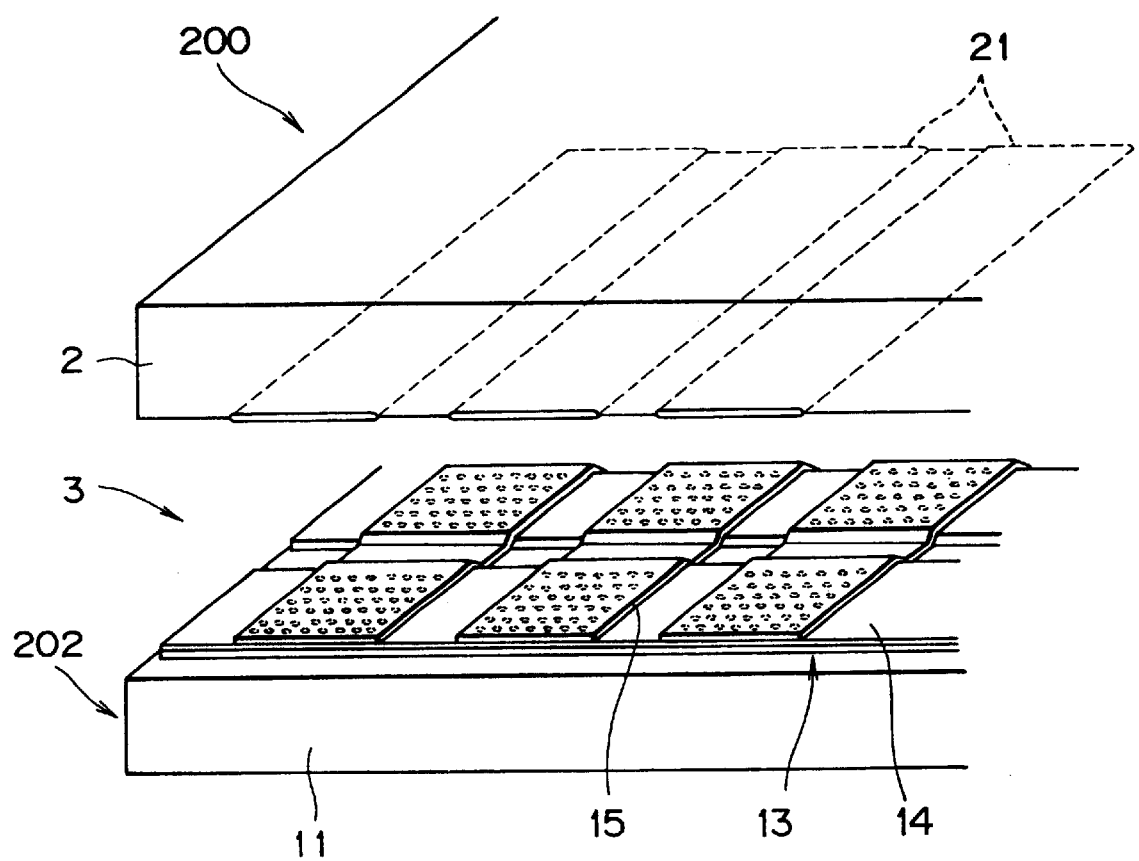
FIG. 3 is a perspective view showing a display according to the first embodiment.

FIG. 3 is a perspective view showing one example of a display according to the present invention. Referring to FIG. 3, a display 200 includes an electron emission source 202 in this embodiment particularly shown in FIG. 2, and an upper substrate 2 disposed on the electron emission source 202 via a high vacuum region 3.

The electron emission source 202 includes, as shown in FIG. 2, a lower substrate 11 made from a glass material. A plurality of strip-like cathode electrode lines 13 are formed on the surface of the lower substrate 11; an insulating layer 14 is formed on the cathode electrode lines 13; and a plurality of strip-like gate electrode lines 15 are formed on the insulating layer 14 in such a manner as to intersect the cathode electrode lines 13. Connection ends of the cathode electrode lines 13 and connection ends of the gate electrode lines 15 are connected to a control means (not shown).

Figure 4:
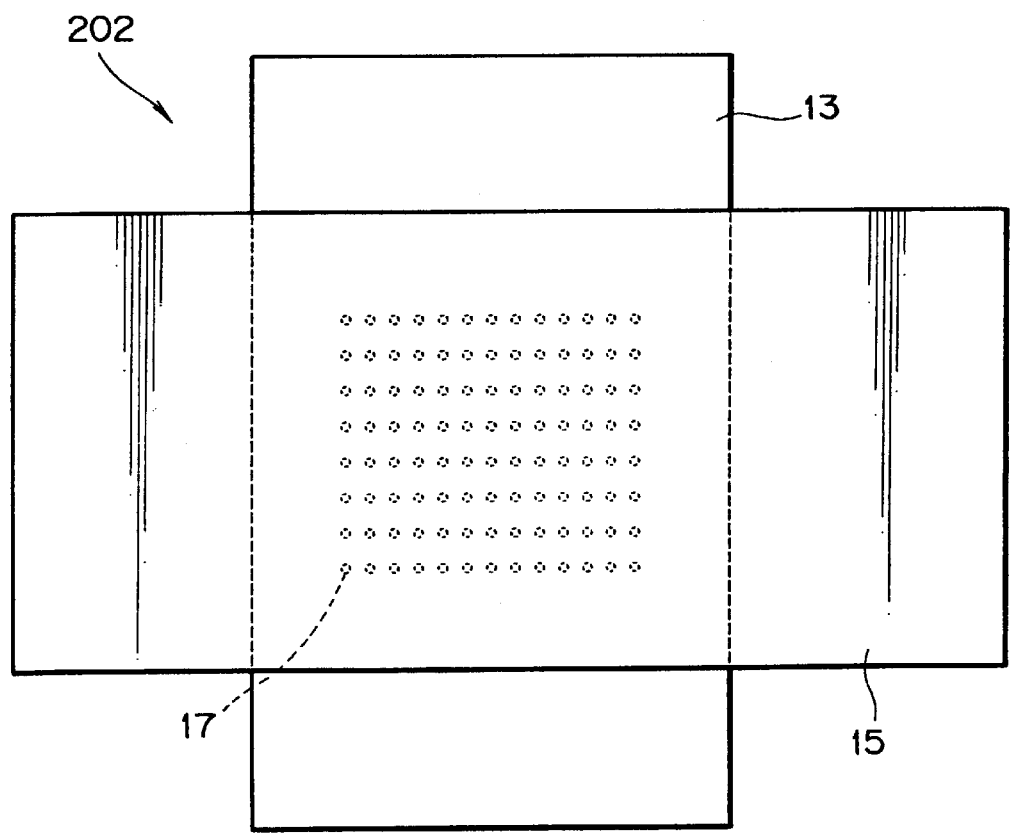
FIG. 4 is a partial plan view showing the electron emission source according to the first embodiment.

Referring to FIG. 4, a number of fine holes 17 are formed in each of intersections between the cathode electrode lines 13 and the gate electrode lines 15. Such an intersection forms a region corresponding to one pixel of the display 200. Referring to FIG. 2 and 6, each of the fine holes 17 passes through the gate electrode line 15 and the insulating layer 14 and reaches the cathode electrode line 13. A metal made projecting structure 161 having a trapezoidal shape in cross-section is provided in the fine hole 17 in such a manner as to project from a portion, located on the bottom of the fine hole 17, of the cathode electrode line 13. An electron emission portion 16 is formed on the upper surface of the projecting structure 161.

An enormous number of fine carbon nano-tubes 16a are erected on the surface of the electron emission portion 16. In this way, the projecting body composed of an enormous number of fine projections is provided on the surface of the electron emission portion 16.

Referring again to FIG. 3, the upper side of the display 200 is configured such that the upper substrate 2 is opposed to the electron emission source 202 via the high vacuum region 3; a plurality of strip-like anode electrode lines 21 are formed on the back surface of the upper substrate 2 in such a manner as to extend in parallel to the gate electrode lines 15; and phosphor stripes are formed on the surface of the anode electrode lines 21.

The electron emission source 202 configured as described above is operated as follows: namely, when a desired one of the cathode electrode lines 13 and a desired one of the gate electrode lines 15 are selected and a specific voltage is applied therebetween by the above-described control means, a specific electric field is applied to the electron emission portions 16 in the corresponding pixel region, whereby electrons are emitted from the leading ends of the carbon nano-tubes 16a on each of the electron emission portions 16 on the basis of the tunnel effect.

At this time, in the display 200 including the electron emission source 202, the electrons emitted from the electron emission portions 16 in each fine hole 17 by exciting the specific pixel region are accelerated by a voltage applied between the cathode electrode line 13 and the anode electrode line 21 on the upper substrate 2 by the control means, and reach the phosphor stripe through the high vacuum region 3 between the gate electrode line 15 and the upper substrate 2. When receiving the electrons, the phosphor stripe emits visual light, and the visual light is observed through the transparent anode electrode 21 and upper substrate 2.

According to the electron emission source 202 in this embodiment, since the metal projecting structure 161 in each fine hole 161 has a trapezoidal shape in cross-section, the distance between the upper end of the projecting structure 161 and the gate electrode line 15 is shorter than the distance between the upper end of the projecting structure 161 and the surface of the cathode electrode line 13. Accordingly, an electric field is effectively applied to the surface of the electron emission portion 16 formed on the top of the projecting structure 161. As a result, it is possible to obtain a field emission current at a lower voltage.

For example, it is possible to ensure a current amount necessary for the display only by applying an electric field strength of several tens V/$\mu$m or less to the electron emission portions 16, that is, only by applying a voltage of several tens V or less between the cathode electrode line 13 and the gate electrode line 15. As a result, it is possible to drive the electron emission source 202 at a lower voltage and hence to drive the display 200 including the electron emission source 202 at a low voltage.

Further, for this electron emission source 202, since an enormous number of carbon nano-tubes 16a are erected on the surface of the electron emission portion 16, electrons can be easily emitted from the electron emission portion 16, with a result that it is possible to drive the display 200 including the electron emission source 202 at a lower voltage.

Figure 1:
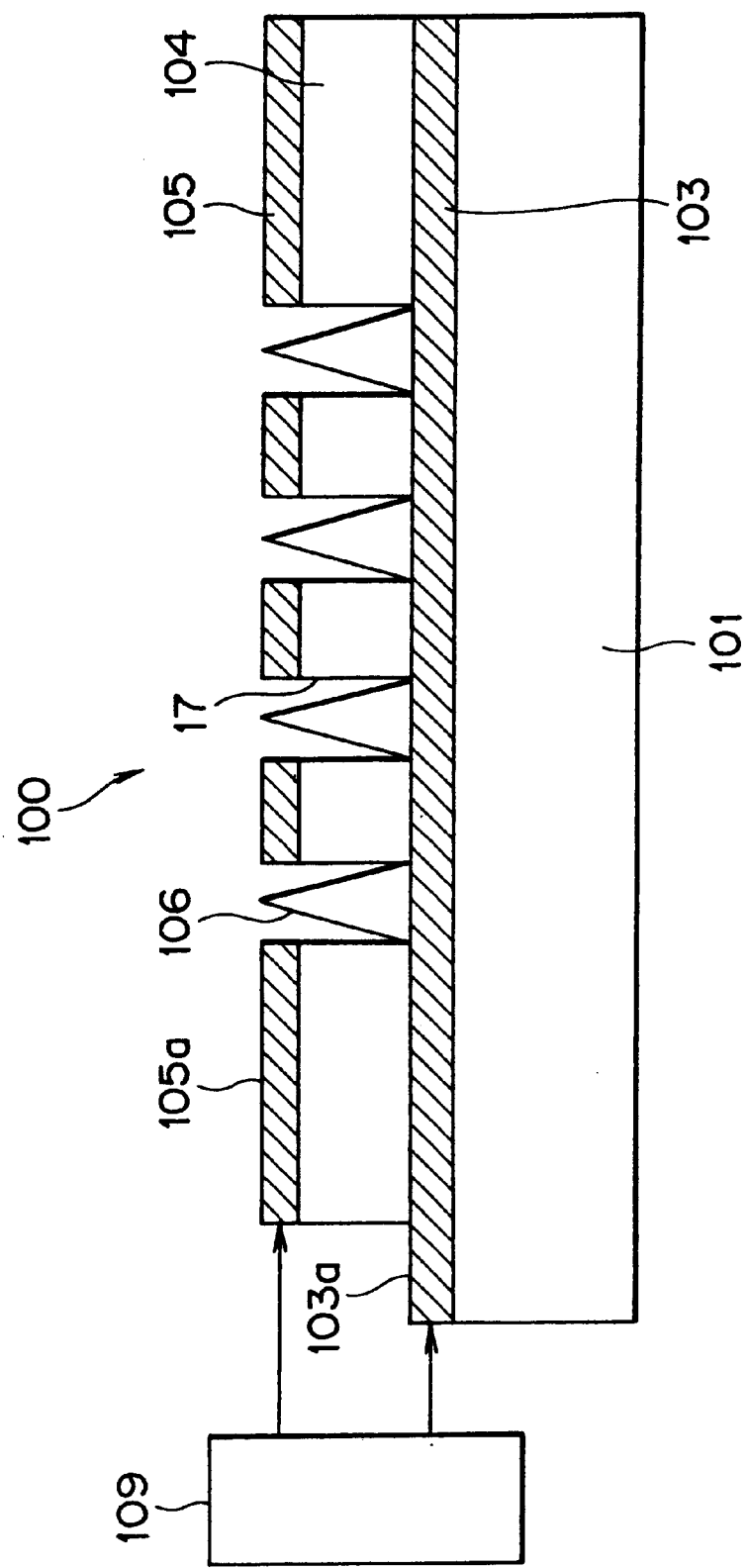
FIG. 1 is a partial sectional side view showing one example of a prior art electron emission source.

The electron emission portion 16 formed on the projecting structure 161 having a trapezoidal shape in cross-section is not sharpened, that is, flattened unlike the microchip 106 (see FIG. 1), it is easy to uniformly produce the electron emission portions 16, and thereby it is possible to solve the problem that the current amount differs for each pixel. This makes it possible to make uniform bright spots formed on the upper substrate 2 of the. display 200, and hence to improve the image quality.

The flat shape of the electron emission portion 16 brings another advantage that electrons emitted from the electron emission portion 16 are allowed to be filed while being not extended so much. This is effective to make small the sizes of bright spots formed on the upper substrate 2 of the display 200, and hence to make clear an image, that is, improve the image quality.

The flat shape of the electron emission portion 16 beings a further advantage that even if gas remaining in the vacuum region is ionized to sputter the electron emission portion 16, the shape of the electron emission portion 16 is not changed. Accordingly, the current amount is not reduced with an elapsed time, and the service life of the electron emission portion 16 is prolonged. As a result, it is possible to prolong the service life of the display 200 including the electron emission source 202.

Since the distance between the second electrode and the electron emission portion 16 can be made longer than that in the case of using the microchip 106, it is possible to suppress short-circuit between the electrodes and hence to improve the production yield. This is effective to reduce the production cost of the display 200.

Although the fine hole 17 in this embodiment is formed into a circular shape as shown in FIG. 4, it may be formed into a polygonal or elliptic shape. Further, as shown by a partial plan view of FIG. 5 equivalent to FIG. 4, the fine holes 17 may be replaced with fine holes 17A configured as grooves extending in one direction.

The carbon thin film constituting the electron emission portion 16 may be a DLC (Diamond-Like Carbon) or an amorphous diamond film.

To reduce the resistivity of the electron emission portion 16, it is effective to use a nitrogen-containing carbon thin film as the electron emission portion 16. As a result, it is possible to drive the electron emission source 202 at a very lower voltage.

In the display 200 in this embodiment, as shown in FIG. 3, the upper substrate 2 (equivalent to the glass substrate in the claims) is provided with a gap put between the electron emission source and the upper substrate 2; the anode electrode lines 21 (equivalent to the anode electrode in the claims) are formed by vapor-depositing a metal such aluminum on the bottom surface portion, opposed to the electron emission source 202, of the upper substrate 2 (equivalent to the surface, opposed to the electron emission source, of the glass substrate in the claims); and the phosphor screen is formed on the surfaces of the anode electrode lines 21 (equivalent to the surface, opposed to the electron emission source, of the anode electrode in the claims).

The positional relationship between the anode electrode lines 21 and the phosphor screen in the display, however, may be reversed to that described above. That is to say, there may be adopted a configuration that the upper substrate 2 is provided with a gap put between the electron emission source 202 and the upper substrate 2; the phosphor screen is formed on a surface, opposed to the electron emission source 202, of the upper substrate 2; and the anode electrode lines 21 are formed by vapor-depositing a metal such as aluminum on the surface, opposed to the electron emission source 202, of the phosphor screen.

Next, a method of producing the electron emission source 202 will be described.

FIGS. 7 to 10 are sectional side views of fragmental structures of the electron emission source 202 showing steps of producing the electron emission source 202.

Referring to FIG. 7, a conductive film made from niobium, molybdenum or chromium is formed on a lower substrate 11 made from a glass material to a thickness of about 2,000 Å. The conductive film is patterned into lines by a photolithography process and a reactive ion etching process, to form cathode electrode lines 13.

An insulating film 14 made from silicon dioxide is formed on the cathode electrode lines 13 by a sputtering or chemical vapor-deposition process. A conductive film made from niobium or molybdenum is formed on the insulating layer 14. The conductive film is patterned into lines extending in such a manner as to intersect the cathode electrode lines 13 by the photolithography process and reactive ion etching process, to form gate electrode lines 15.

Fine holes 17, each being formed into a circular shape in a plan view, are formed in such a manner as to pass through the gate electrode lines 15 and insulating film 14 and reach the cathode electrode lines 13 by the photolithography process and reactive ion etching process.

Aluminum is obliquely vapor-deposited while the substrate is rotated, to form an aluminum film 40 as a sacrifice layer used for lift-off. The reason why aluminum is vapor-deposited in the oblique direction shown by arrows in FIG. 7 is to prevent adhesion of aluminum on the bottoms of the fine holes 17.

Figure 8:
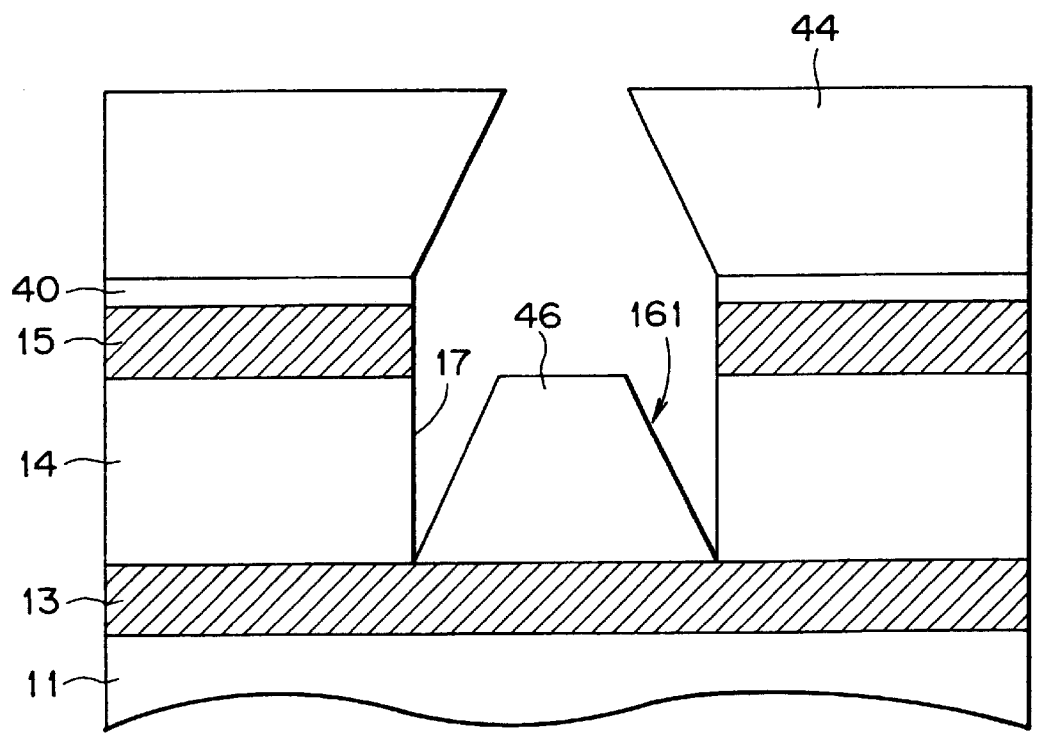

As shown by a partial sectional side view of FIG. 8, a metal such as tungsten, tantalum, molybdenum, niobium, or nickel is vapor-deposited in each fine hole 17, to form a projecting structure 161 having a trapezoidal shape in cross-section.

Upon the above vapor-deposition of the metal, the metal film grows on both the bottom of each fine hole 17 and the upper surface of the sacrifice layer. To be more specific, a metal film 44 grows on the sacrifice layer in such a manner as to project from the edge of the opening of each fine hole 17 and to make narrow the diameter of the opening of the fine hole 17.

Along with growth of the metal film 44, the upper portion of a metal film 46 grown on the bottom of the fine hole 17 is gradually made narrow. When the height of the metal film 46 reaches a specific value, the vapor-deposition is stopped before the opening of the fine hole 17 is perfectly blocked with the metal film 44. The metal film 46 formed in the fine hole 17 is taken as the projecting structure 161.

Figure 9:
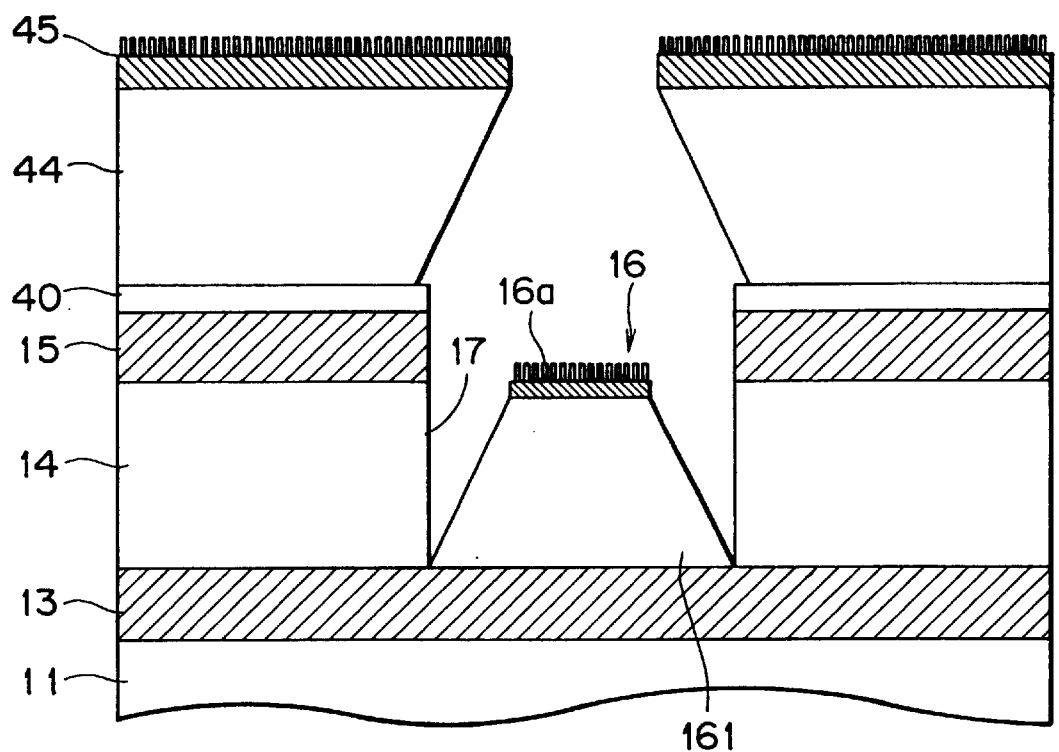

Referring to FIG. 9, the electron emission portion 16 on the surface of which the carbon nano-tubers 16a are formed is formed on the upper surface of the projecting structure 161 by vapor-deposition process or chemical vapor-deposition (CVD) process.

Concretely, a solid carbon material is irradiated with an electron beam in vacuum, being evaporated by heating, and is made to adhere on the upper surface of the projecting structure 161, to form the electron emission portion 16 on the surface of which the carbon nano-tubes 16a are erected.

Alternatively, either or a plurality of methane, acetone and alcohol are introduced in vacuum to be brought into contact with a heating filament and decomposed by heating, and is made to adhere on the upper surface of the projecting structure 161, to form the electron emission portion 16 on the surface of which the carbon nano-tubes 16a are erected.

Figure 10:
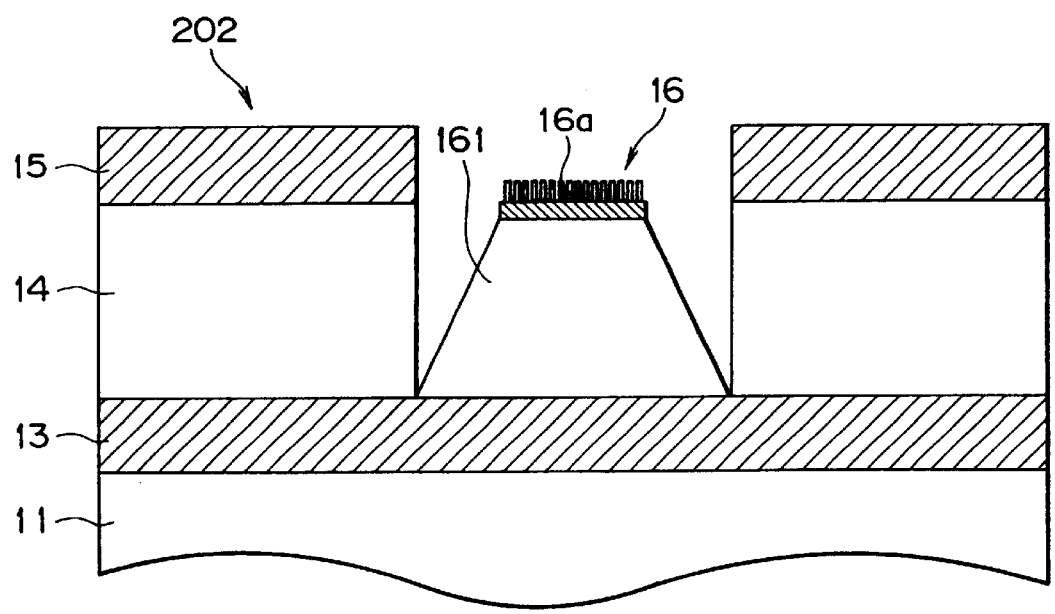

Finally, the metal film 44 on the aluminum film 40 as the sacrifice layer and the carbon film 45 deposited upon formation of the electron emission portion are removed together with the aluminum film 40 by etching the aluminum film 40 with an acid solution such as hydrochloric acid or an alkali solution such as sodium hydroxide, to obtain an electron emission source shown in FIG. 10.

According to this embodiment, as described above, after the projecting structure 161 having a trapezoidal shape in cross-section is formed in the fine hole 17, the diameter of the opening of the fine hole 17 becomes narrow by an amount equivalent to the projecting amount of the metal film 44. As a result, it is possible to reduce an inconvenience that there occurs electric contact between the gate and cathode via the carbon thin film upon formation of the electron emission portion 16, and hence to improve the reliability.

Second Embodiment

A second embodiment of the present invention will be described below.

Figure 11:
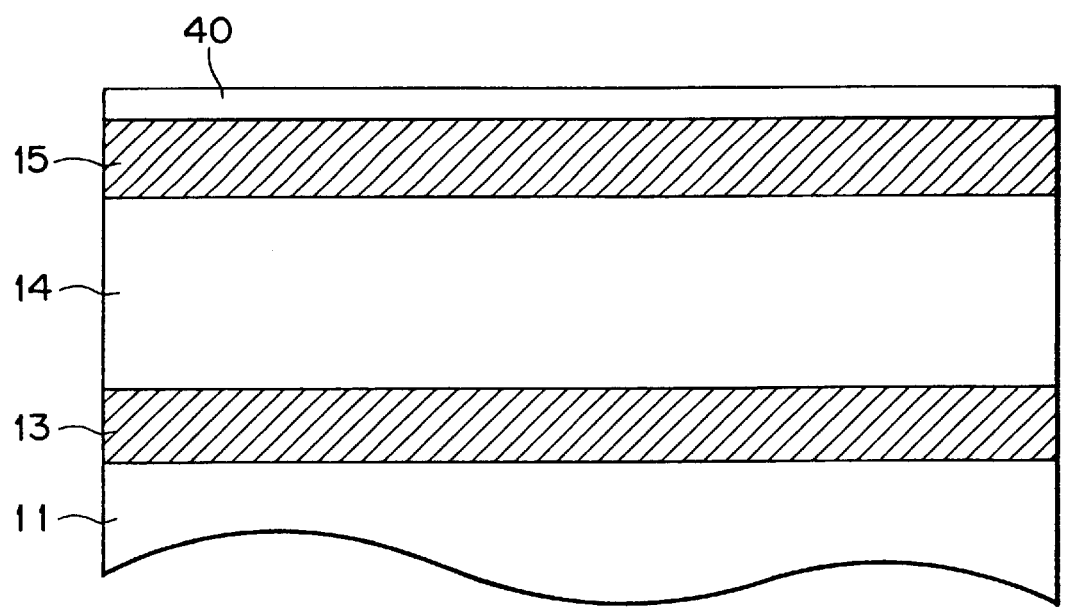
FIGS. 11 and 12 are sectional side views showing steps of producing an electron emission source according to a second embodiment.
Figure 12:
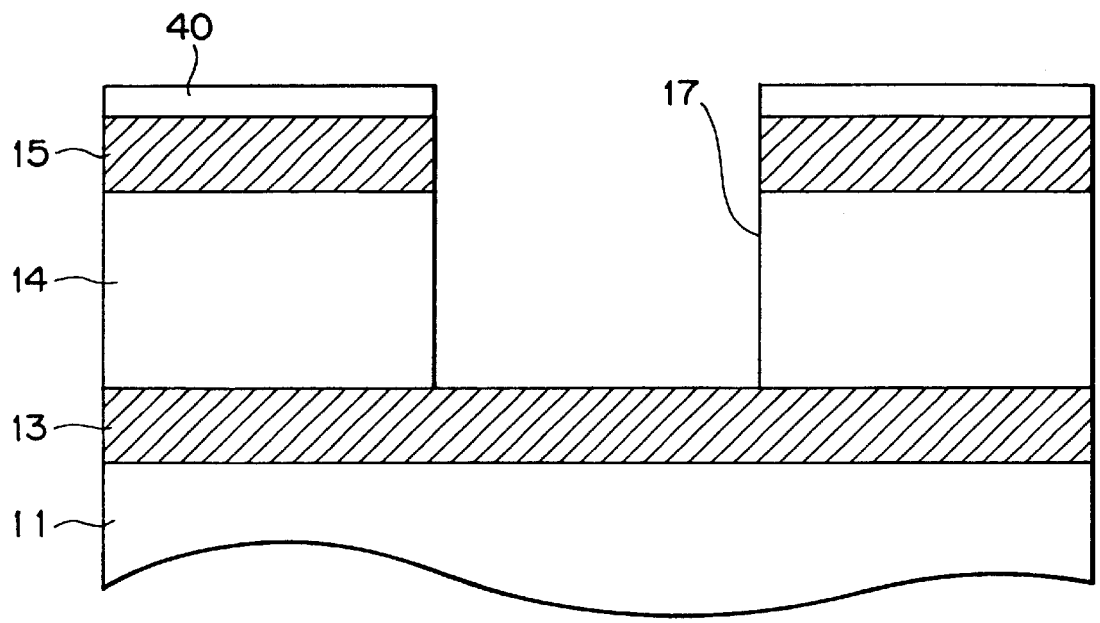

FIGS. 11 and 12 are sectional side views of fragmental structures of an electron emission source produced according to the second embodiment. In the figures, parts corresponding to those shown in FIGS. 7 to 10 are designated by the same reference numerals.

The production method according to the second embodiment is different from that according to the first embodiment in terms of the process of forming the aluminum film 40 as the sacrifice layer.

Referring to FIG. 11, after cathode electrode lines 13, an insulating layer 14, and gate electrode lines 15 are formed on a lower substrate 11, an aluminum film as a sacrifice layer is formed by sputtering.

Referring to FIG. 12, fine holes 17 are formed in such a manner as to pass through the aluminum film 40, gate electrode lines 15, and insulating layer 14 by the photolithography process and etching process.

The subsequent steps are carried out in accordance with the same manner as that described with reference to FIGS. 8 to 10. That is to say, a projecting structure 161 is formed in each of the fine holes 17 and an electron emission portion 16 is formed on the projecting structure 161, to obtain an electron emission source according to this embodiment.

According to this embodiment, since the fine holes 17 are formed after the aluminum film 40 is formed, the aluminum film 40 is not formed on the bottom of each fine hole 17 by vapor-deposition, and accordingly, it is not required to obliquely vapor-depositing aluminum while rotating the substrate. As a result, there can be obtained an effect of simplifying the process of forming the aluminum film 40.

Figure 5:
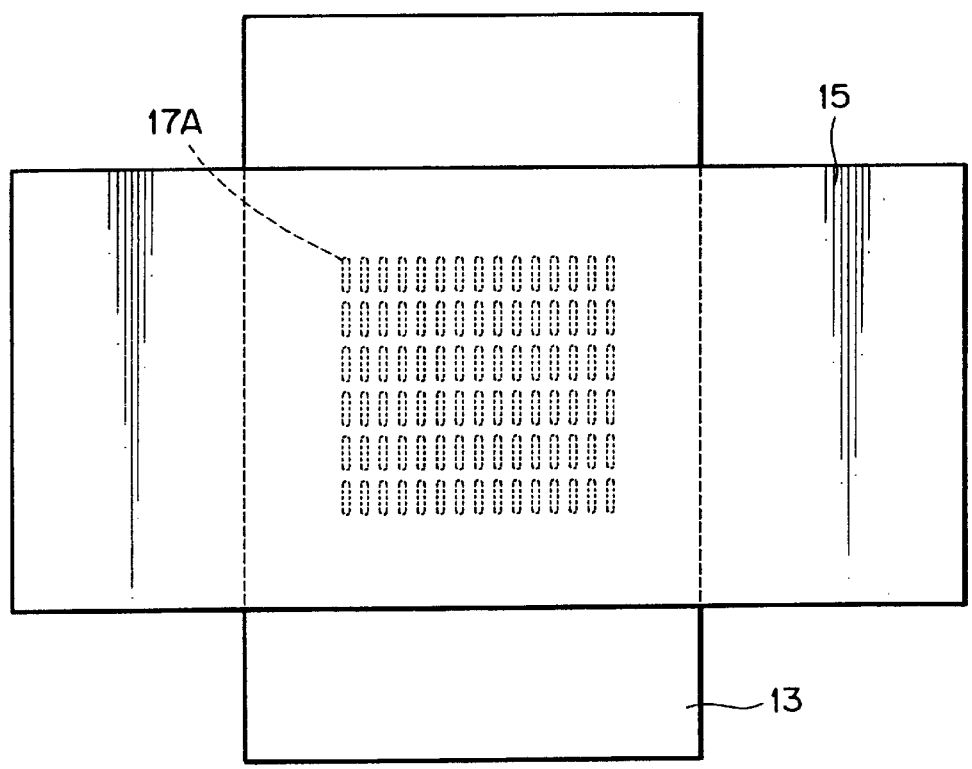
FIG. 5 is a partial plan view of a variation of the electron emission source according to the first embodiment.

The shape of the fine hole 17 is not limited to a circular shape but may be a polygonal or elliptic shape, or a groove-shape as shown in FIG. 5. The fine holes 17, each having any one of the above shapes, can be formed in accordance with the production method of the second embodiment.

Third Embodiment

A third embodiment of the present invention will be described below.

Figure 13:
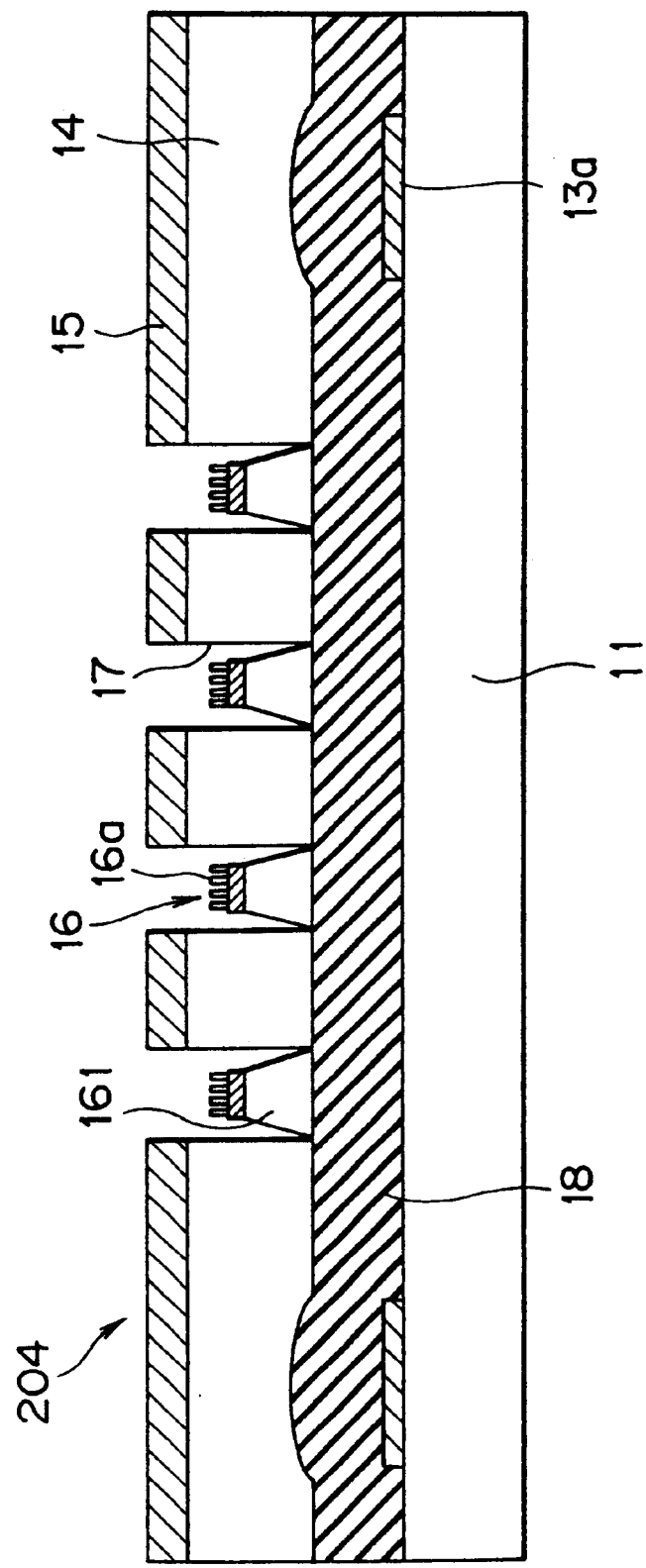
FIG. 13 is a partial sectional side view showing an electron emission source according to a third embodiment.
Figure 14:
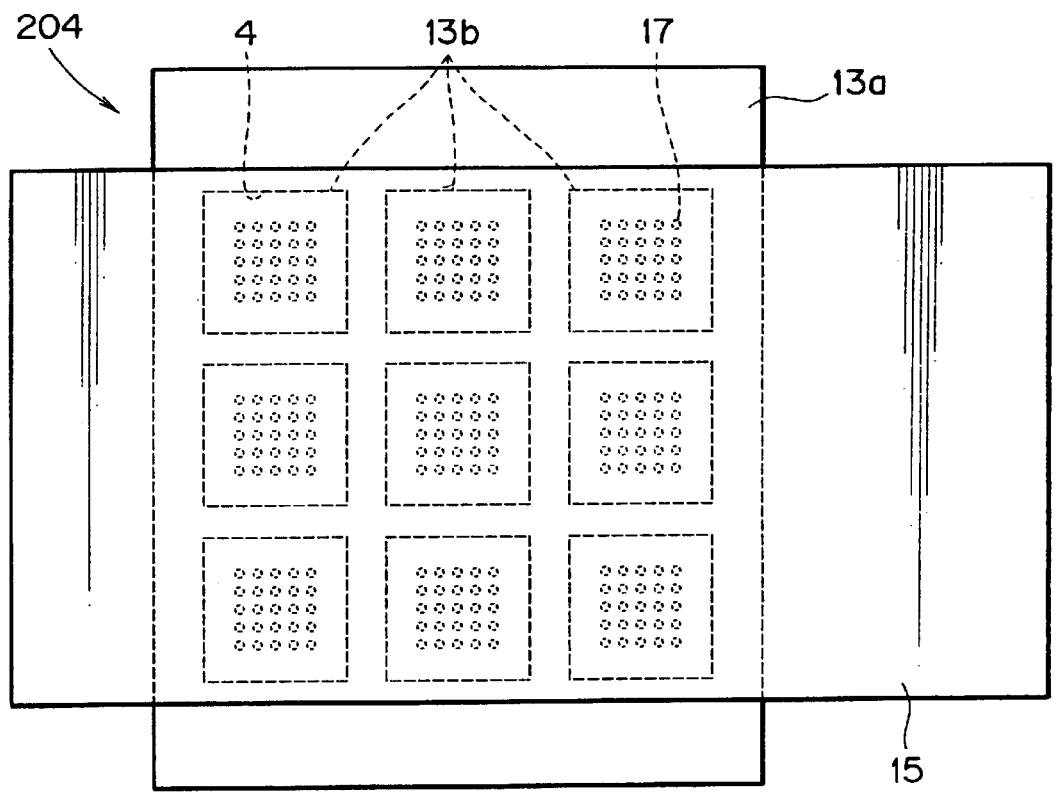
FIG. 14 is a partial plan view showing the electron emission source according to the third embodiment.

FIG. 13 is a sectional side view of an electron emission source according to the third embodiment, and FIG. 14 is a plan view of the electron emission source shown in FIG. 13. In the figures, parts corresponding to those shown in FIGS. 2 and 4 are designated by the same reference numerals, and the overlapped explanation thereof is omitted.

An electron emission source 204 in this embodiment is different from the electron emission source 202 in the first embodiment in that, as shown in FIG. 14, a plurality of areas arranged in a network pattern are cut off from one pixel region of each cathode electrode lines 13a, and as shown in FIG. 13, a conductive thin film 18 is formed on the cathode electrode line 13a.

To be more specific, as shown in FIG. 14, a plurality of quadrangular areas 13b are cut off from the one pixel region of the cathode electrode line 13a. The quadrangular areas (cut-off areas) 13b, each being formed into an approximately square shape in this embodiment, are arranged typically into a matrix pattern of 3×3.

Referring to FIG. 13, the conductive thin film 18 having a resistance higher than that of the cathode electrode line 13a is entirely formed on each of the cathode electrode lines 13a including the quadrangular areas 13b. Since the thin film 18 being in contact with the cathode electrode line 13a is at the same potential as that of the cathode electrode line 13a, it functions as the cathode electrode.

A number of fine holes 17 are formed in an approximately square section at the central portion of each quadrangular area 13b. As shown in FIG. 13, the fine hole 17 has a depth reaching the surface of the thin film 18. A projecting structure 161 is formed in each fine hole 17 in such a manner as to project from a portion, located at the bottom of the fine hole 17, of the thin film 18. A carbon film as an electron emission portion 16 is formed on the upper surface of each of the projecting structures 161 in accordance with the same manner as that described above.

According to the electron emission source 204 having the above configuration, as shown in FIG. 14, it is possible to keep a specific distance between each of the fine holes 17 arranged on the outer side of each quadrangular area 13b and an inner edge 4 of the cathode electrode line 13a, and to interpose the thin film 18 between each of the projecting structures 161 in each quadrangular area 13b and the peripheral cathode electrode line 13a with a sufficient distance put therebetween.

As a result, according to this embodiment, it is possible not only to obtain the same effect as that obtained in the first embodiment, but also to obtain another effect that even if metal pieces and the like permeate in the fine hole 17 upon production to cause short-circuit between the electron emission portion 16 and the gate electrode 15, it is possible to suppress a current flowing in the electron emission portion 16 by the effect of the resistance of the thin film 18, and hence to prevent breakage of the electron emission portion 16.

According to this embodiment, it is possible to obtain another effect of making small a variation in amount of a current emitted from each electron emission portion by the voltage-drop characteristic of the thin film 18. To be more specific, at an electron emission portion in which a large amount of current tends to flow, a voltage-drop occurs by the fact that the current flows in the thin film 18, so that the voltage effectively applied is reduced and thereby the current amount is limited. Consequently, as compared with the case not adopting the resistance layer 18, it is possible to make small a variation in current amount between an electron emission portion in which a current is easy to flow and an electron emission portion in which a current is not easy to flow, and hence to improve the uniformity of the brightness between the pixels.

In this embodiment, the thin film 18 is formed on the cathode electrode lines 13a; however, the same effect can be obtained by forming the cathode electrode lines 13a on the thin film 18.

The thin film 18 may be made from a conductor having a resistance higher than that of the cathode electrode line 13a within a range in which the electron emission portion 16 is substantially at the same level as that of the cathode electrode line 13a upon operation of the electron emission source. The thin film 18 may be of course made from a semiconductor material.

In this embodiment, a plurality of the quadrangular areas 13b, which are cut off from one pixel region of the cathode electrode line 13a, are each formed into a square shape; however, the shape of the cut-off area is not limited to the square shape but may be a rectangular shape or the like.

Although the number of the quadrangular areas 13b is set at nine in this embodiment, it is not limited thereto but may be set at one or another.

While the preferred embodiments of the present invention have been described using specific terms, such description is for illustrative purposes only, and it is to be understood that changes and variations may be made without departing from the spirit or scope of the following claims.

What is claimed is:

1. An electron emission source comprising:
   a first electrode extending on a substrate;
   a second electrode extending on said first electrode via an insulating layer;

one or a plurality of fine holes opened in said second electrode in such a manner as to reach said first electrode through said insulating layer;

a metal made projecting structure having a trapezoidal shape in cross-section, said projecting structure being formed in each of said one or plurality of fine holes in such a manner as to project from a portion, positioned in said fine hole, of said first electrode; and an electron emission portion made from an electron emission material, said electron emission portion being formed on the upper surface of said projecting structure;

wherein a projecting body composed of an enormous number of fine projections is provided on the surface of said electron emission portion.

2. An electron emission source according to claim 1, wherein the area of said electron emission portion is smaller than the area of the opening portion of said fine hole.

3. An electron emission source according to claim 1, wherein said electron emission material is carbon.

4. An electron emission source according to claim 3, wherein said projection is a carbon nano-tube.

5. An electron emission source according to claim 3, wherein said electron emission portion contains nitrogen.

6. An electron emission source according to claim 1, wherein the shape of the opening of said fine hole is either of an approximately circular shape, an elliptic shape, and a quadrangular shape in a plan view.

7. An electron emission source according to claim 1, wherein said fine hole is formed into a groove-shape.

8. An electron emission source according to claim 1, wherein said first electrode is composed of an electrode main body having a relatively small resistance, and a conductor stacked on said electrode main body and having a relatively large resistance; and one or a plurality of partially cut-off areas are formed in said electrode main body, and said one or plurality of fine holes are formed in each of said one or plurality of cut-off areas with a gap put between each of said fine holes and the edge of said cut-off area.

9. An electron emission source according to claim 8, wherein said cut-off area of said electrode main body is formed into a quadrangular shape.

10. An electron emission source according to claim 8, wherein a plurality of said cut-off areas are formed in said electrode main body in such a manner as to be arranged in a matrix pattern.

11. An electron emission source according to claim 1, wherein the material of said projecting structure is different from the material of said first electrode.

12. A display comprising:

an electron emission source including: a first electrode extending on a substrate; a second electrode extending on said first electrode via an insulating layer; one or a plurality of fine holes opened in said second electrode in such a manner as to reach said first electrode through said insulating layer; a metal made projecting structure having a trapezoidal shape in cross-section, said projecting structure being formed in each of said one or plurality of fine holes in such a manner as to project from a portion, positioned in said fine hole, of said first electrode; and an electron emission portion made from an electron emission material, said electron emission portion being formed on the upper surface of said projecting structure; wherein a projecting body composed of an enormous number of fine projections is provided on the surface of said electron emission portion; and an anode electrode and a phosphor screen disposed opposite to said electron emission source with a gap put therebetween;

whereby electrons are emitted from said electron emission portion by applying a voltage between said first and second electrodes, and are made incident on said phosphor screen to make luminous said phosphor screen.

13. A display according to claim 12, wherein said first electrode is configured as a plurality of strip-like first electrodes extending substantially in the same direction in such a manner as to be spaced from each other at intervals in the transverse direction;

said second electrode is configured as a plurality of strip-like second electrodes extending in such a manner as to intersect said plurality of first electrodes and to be spaced from each other at intervals in the transverse direction;

said one or plurality of fine holes are formed in each of intersections between said first and second electrodes; and said anode electrode is configured as a plurality of strip-like anode electrodes each extending in such a manner as to be opposed to the corresponding one of said second electrodes.

14. A display according to claim 12, wherein said electron emission material is carbon, and said projecting body is composed of carbon nano-tubes.

15. A display according to claim 12, wherein a glass substrate is provided with a gap put between said electron emission source and said glass substrate;

said anode electrodes are formed on a surface, opposed to said electron emission source, of said glass substrate; and said phosphor screen is formed on surfaces, opposed to said electron emission source, of said anode electrodes.

16. A display according to claim 12, wherein a glass substrate is provided with a gap put between said electron emission source and said glass substrate;

said phosphor screen is formed on a surface, opposed to said electron emission source, of said glass substrate; and said anode electrodes are formed on a surface, opposed to said electron emission source, of said phosphor screen.

* * * * *